Oct. 8, 1968

R. P. DIXON 3,404,919

METHOD OF CREATING LARGE DIAMETER BOREHOLES
USING UNDERGROUND NUCLEAR DETONATIONS

Filed May 4, 1966

INVENTOR.
ROD P. DIXON

BY Burns, Doane, Benedict,
Swecker & Mathis

ATTORNEYS

Oct. 8, 1968  R. P. DIXON  3,404,919
METHOD OF CREATING LARGE DIAMETER BOREHOLES
USING UNDERGROUND NUCLEAR DETONATIONS
Filed May 4, 1966  3 Sheets-Sheet 2

INVENTOR.
ROD P. DIXON

ATTORNEYS

Oct. 8, 1968 R. P. DIXON 3,404,919
METHOD OF CREATING LARGE DIAMETER BOREHOLES
USING UNDERGROUND NUCLEAR DETONATIONS
Filed May 4, 1966 3 Sheets-Sheet 3

INVENTOR.
ROD P. DIXON
BY
ATTORNEYS

United States Patent Office 3,404,919
Patented Oct. 8, 1968

3,404,919
METHOD OF CREATING LARGE DIAMETER BOREHOLES USING UNDERGROUND NUCLEAR DETONATIONS
Rod P. Dixon, Salt Lake City, Utah, assignor to Nuclear Processing Corporation, Salt Lake City, Utah, a corporation of Utah
Continuation-in-part of application Ser. No. 325,721, Nov. 22, 1963. This application May 4, 1966, Ser. No. 547,672
9 Claims. (Cl. 299—13)

ABSTRACT OF THE DISCLOSURE

Deep, large diameter bore holes are created in a geological formation by first drilling a slim hole, detonating a nuclear device in the slim hole, and thereafter reaming the slim hole to the desired diameter, the nuclear device being of a size predetermined to produce a cavity of sufficient volume to receive the cuttings received in the reaming operation. In preferred embodiments the large hole is used as a means for emplacing one or more large nuclear devices in the formation to break and fracture it for the recovery of mineral values therefrom, and a second hole may be drilled to permit emplacement of a further nuclear device at a location such that its detonation creates a cavity toward which the previously broken formation can cave, thereby increasing the permeability of the broken formation.

---

This application is a continuation-in-part of co-pending application 325,721 filed Nov. 22, 1963, now U.S. Patent 3,303,881, which in turn is a continuation-in-part of application Ser. No. 789,747 administratively accorded a filing date of Jan. 28, 1959 and 833,443 filed Aug. 13, 1959, both now abandoned. Conversely, application Ser. No. 681,146 filed Nov. 7, 1967 is a continuation-in-part of the present application and claims subject matter originally disclosed herein.

The invention relates to the use of underground nuclear detonations in creating large diameter bore holes or entry means of great depths. It also relates to a process for breaking up rock underground by nuclear means in an economical manner. It further relates to a process of efficiently using the heat thus liberated underground, e.g. in the treatment of solid or semi-solid hydrocarbons in an underground formation. More particularly it relates to an improvement in placing large amounts of energy underground and effectively utilizing the emplaced energy or heat in the production of usable hydrocarbons from a formation located above the area where the heat was previously placed. In a particularly useful embodiment this invention relates to the sequential placement of nuclear fusion devices below a relatively shallow solid hydrocarbon formation such as an oil shale formation in such relation that an exceptionally efficacious utilization of energy released by the nuclear device is made.

Nuclear explosions are of two kinds. In the pure fission detonation the total energy release, except for a very small conventional TNT trigger, the energy comes from the breaking up of large atoms by fission. In the so-called fusion detonation there is a conventional trigger which activates a fission charge and this in turn detonates the fusion material which is tritium and/or deuterium. The fuels of fusion explosions are deuterium and tritium.

In addition to largely avoiding the substantive problem caused by the radiation released by the nuclear fission detonations fusion devices have the advantage of being economical sources of energy.

With regard to the nature of the energy release, radiation and cost of nuclear devices as well as with regard to their diameters, The Atomic Energy Commission and The United States Bureau of Mines at the 1965 Oil Shale Sumposium at Denver released a report entitled, "Fracturing Oil Shale with Nuclear Explosives for In-Situ Retorting," by M. A. Lekas, USAEC, and H. C. Carpenter, USBM, containing the following information.

The energy of a nuclear explosive is measured in equivalent tons of TNT. A kiloton, the basic unit, is equal to 1,000 tons of TNT or $10^{12}$ calories. The explosives can be designed to yield from fractions up to thousands of kilotons.

Fission explosives release energy through the splitting of heavy atoms; uranium 235 and plutonium 239 are the fuels of these explosives. These fuels are relatively expensive, and they produce radioactive products that are largely solids and have a relatively long half life. They are generally used for explosives in the smaller yield range.

Fusion (thermonuclear) explosives generate their energy largely through the fusion, or joining, of light atoms to form heavier atoms and result in radioactive products having relatively a short half life.

Since, in underground applications, the explosives are generally emplaced in cased drill holes, the diameters of the explosives are important. The AEC has declassified a range of yield and associated diameters of explosives that could be made available using current designs which information is summarized in Table I.

*Table I.—Diameters of nuclear explosives*

| Yield, kt.: | Diameter of cannister |
|---|---|
| Up to 10 inches | In the range of 12 |
| Up to 100 do | In the range of 18 |
| Up to 1,000 do | In the range of 24 |
| Up to 10,000 do | In the range of 36 |

The internal diameter of the emplacement hole must be large enough to accommodate the cannister after the hole has been cased. The length of the cannister is roughly two to four times the diameter.

The AEC has published a list of charges for peaceful uses of nuclear explosives. These charges are shown in Table II.

*Table II.—Charges for thermonuclear explosives*

| Yield, kt.: | Approximate charge |
|---|---|
| 10 | $350,000 |
| 50 | 400,000 |
| 100 | 460,000 |
| 250 | 500,000 |
| 500 | 535,000 |
| 1,000 | 570,000 |
| 2,000 | 600,000 |

These charges are said to include arming and firing the explosive.

The striking feature of the cost of nuclear explosives is that the charge is relatively independent of the energy yield; therefore, as the yield increases, the cost per energy unit decreases. Thus, one is essentially buying an explosion and the energy yield can be selected to meet the need without significantly changing the costs.

From the above it can be seen that in utilizing nuclear explosives it is of great economical importance to employ a process providing for the use of very large devices. In considering such use it is important to note that in addition to device yield and device diameter the depth of placement below the surface of the earth and the thickness of the formation to be treated must be taken into account so as to avoid venting to the atmosphere while making maximum use of the released energy and causing the desired distillation of locked in hydrocarbon products from the formation.

In using the devices of large size the following principles must be kept in mind: that every detonation creates an underground cavity as a result of the radially outward expanding shock wave and in volatilization of the material present and the subsequent expansion of the cavity compresses surrounding material and once all material about the detonation has been compressed the force acts upwardly eventually resulting in a surface upheaval at the earth's surface observable in the form of a shock wave which has degenerated into a seismic wave at some point below the surface and if excessive can do great damage at quite some distance from the epicenter.

Depth of placement will allow the emplacement of large amounts of fusion energy in a formation at relatively small energy cost but this entails a relatively high cost in drilling the entry hole as the cost of drilling a hole increases both in relation to the size of the hole and the depth to which it is to be drilled. At some point the saving in energy cost resulting from the use of larger devices is exceeded by the increased cost of drilling a larger hole to the same depth or perhaps to a greater depth that may be required to avoid venting.

In addition, even if by deeper placement a larger device can be used to obtain a net saving the problem of utilizing such deeply placed energy when the production zone in the formation is substantially closer to the surface than the created energy reservoir is still not solved.

The drilling of a conventional deep oil hole is normally done by rotary means where on the surface a heavy drill inserts into the surface a cutting tool which is attached to drill pipe. Then by means of surface generated energy the pipe is turned and the cutting tool chews the formation away. As the hole is drilled sequentially smaller bits are used.

In such an operation to produce a 12" bottom hole the hole at the surface must be drilled to a substantially larger diameter, and as larger diameter holes are drilled at the surface and below much heavier equipment is required. The cost of drilling large diameter holes increases geometrically. Thus the cost of drilling a 24" bottom hole to a given depth may be 4 to 6 times or more than the cost of cutting a 12" hole. And the cost of a 36" bottom hole at the surface must be drilled to a substantially larger than the cost of a 12" hole to the same depth. Thus it can be seen that if some means of placing a 36" nuclear device at a containable and deep depth other than by expensive drilling can be developed the use of large nuclear explosive devices will be economically that much more attractive.

The drilling industry has a process of enlarging a small diameter hole to a final diameter of 2 to 4 times or larger by reaming. In this process a boring tool is used to enlarge a previously drilled slim hole.

This has been found to be less expensive than drilling to the desired depth in full diameter drilling. However, to be practical some disposition must be made of the cuttings from the operation. In conventional rotary drilling, whether small or large hole, the cuttings are taken back to the surface by circulating liquid or air. In a standard reaming operation, as in operations regarding the mining of copper or silver ore, the small hole is drilled to a point where it intersects a tunnel brought in from the side of the mountain and the cuttings from the reaming operation are taken out the tunnel to the surface. The normal purpose of this reaming operation is to make a shaft or vent to an underground mining operation.

The present invention is described below with reference to the accompanying drawing wherein.

Figure 1:
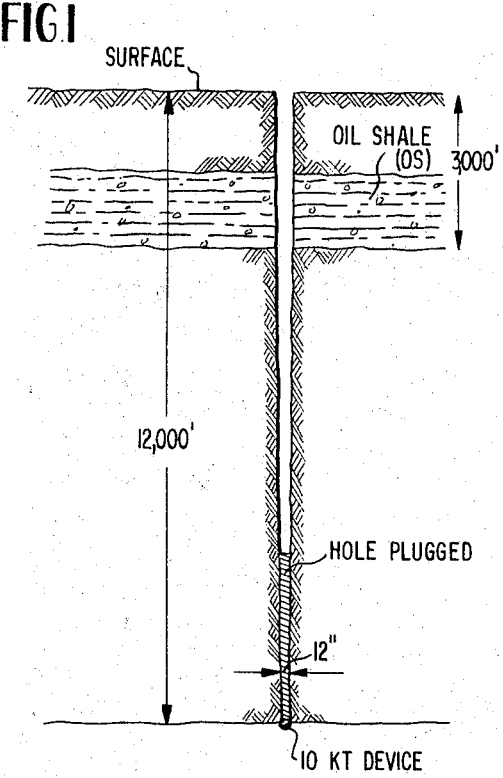
FIGURE 1 is a vertical section thru a geological formation showing a relatively slim hole drilled therein and having a relatively small nuclear explosive placed at the bottom thereof.
Figure 2:
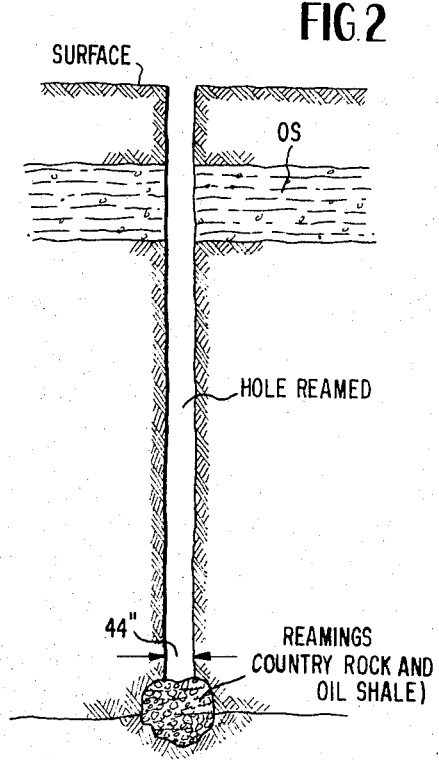
FIGURE 2 is a sectional view thru the same formation after detonation of the nuclear explosive and after reaming of the hole to the desired size diameter, the cuttings from the reaming operation being shown where they dropped down into the cavity produced by the detonation.
Figure 3:
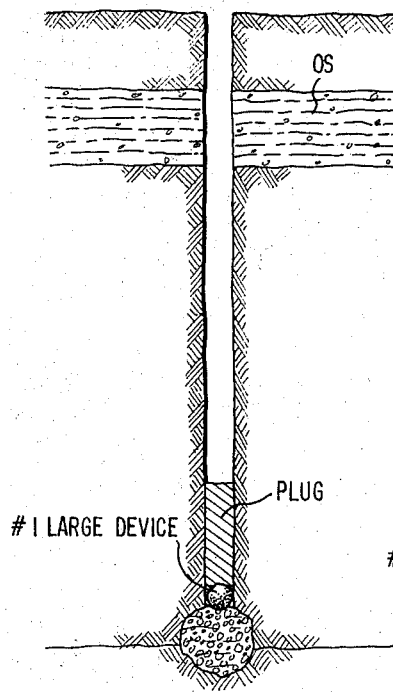
FIGURE 3 is a sectional view thru the same formation showing the emplacement in the enlarged hole of a relatively large nuclear fusion device, the hole being plugged in preparation for the next detonation to prevent venting.
Figure 4:
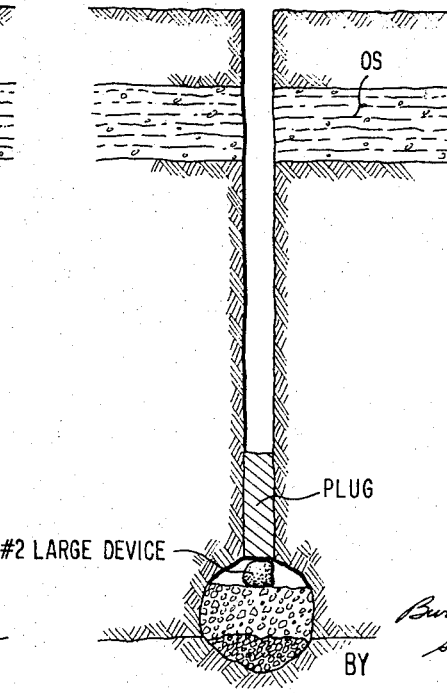
FIGURE 4 is a further sectional view thru the same formation after detonation of the device shown in FIGURE 3, showing the cavity produced thereby and the collection of rubble or rock from the caved roof, and further showing the emplacement of the next relatively large nuclear device therein preliminary to a further detonation.
Figure 5:
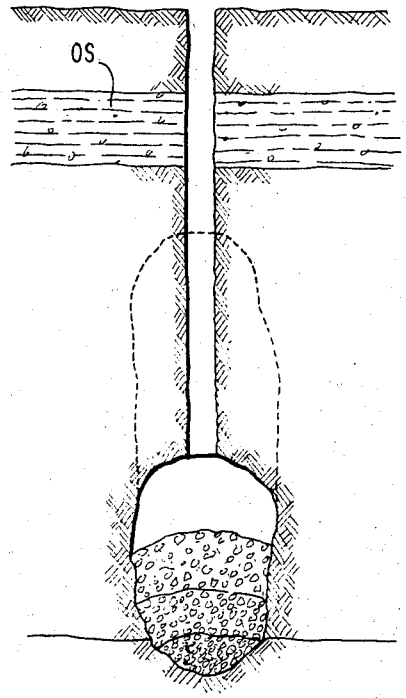
FIGURE 5 shows the crushed and compacted material of the lower detonation and the cavity of the second detonation preliminary to the caving of the roof thereabove, the chimney to be formed upon such caving being indicated by the dotted lines.
Figure 6:
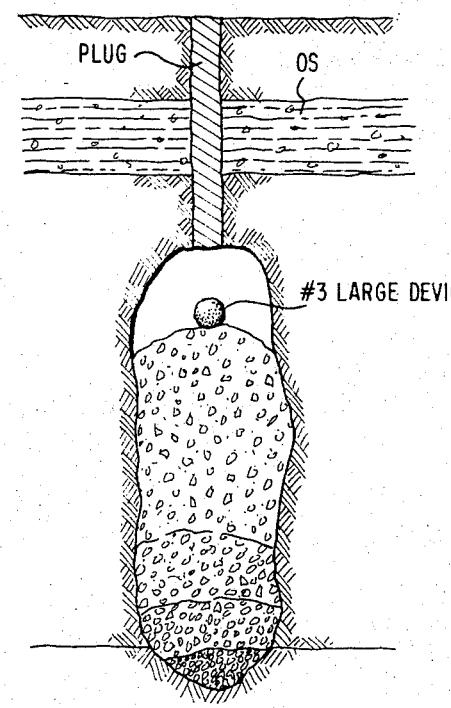
FIGURE 6 is a view analogous to FIGURE 4 after collapse of the roof following the second large detonation and showing the emplacement of a third large device on top of the resulting crushed rock.
Figure 7:
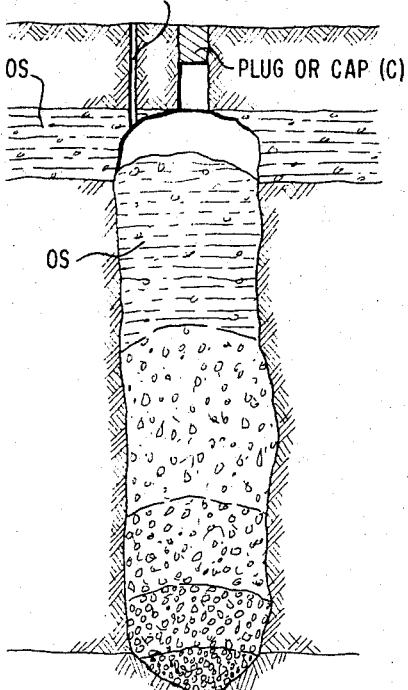
FIGURE 7 is a view analogous to FIGURE 6 indicating the chimney formed when the pay zone collapses into the cavity below after the last detonation and showing a well thru which fluid hydrocarbon products can be removed from the formation.
Figure 8:
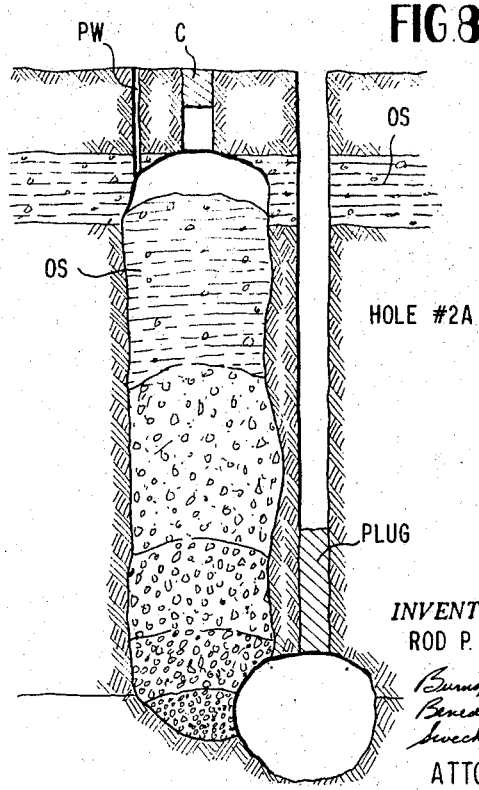
FIGURE 8 is a view similar to FIGURE 7 showing a subsequently bored large diameter hole and a cavity formed at the bottom thereof analogous to the hole and cavity shown in FIGURE 2.
Figure 9:
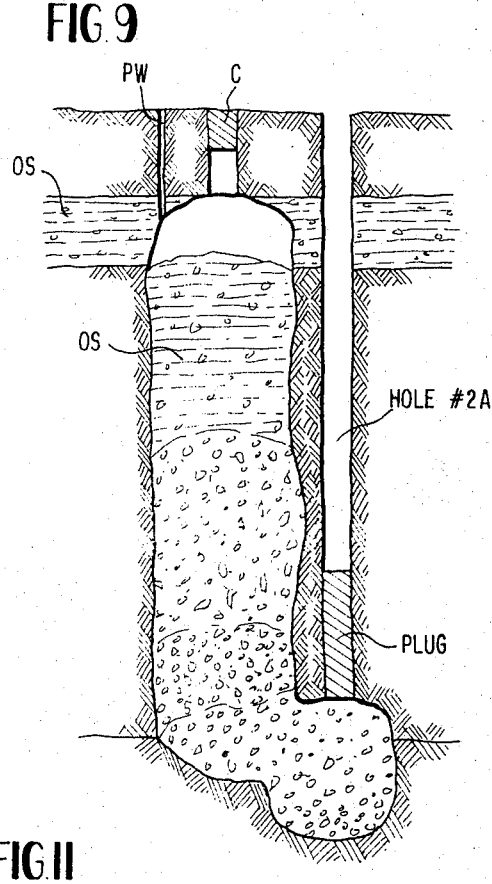
FIGURE 9 is a view thru the same formation after the column of crushed rock has been first thrust upward by the detonation which formed the cavity shown in FIGURE 8 and after downward settling of the previously formed crushed rock into the newly formed cavity, further showing a well from the surface to the chimney in the formation thru which fluid hydrocarbon products can be taken.
Figure 10:
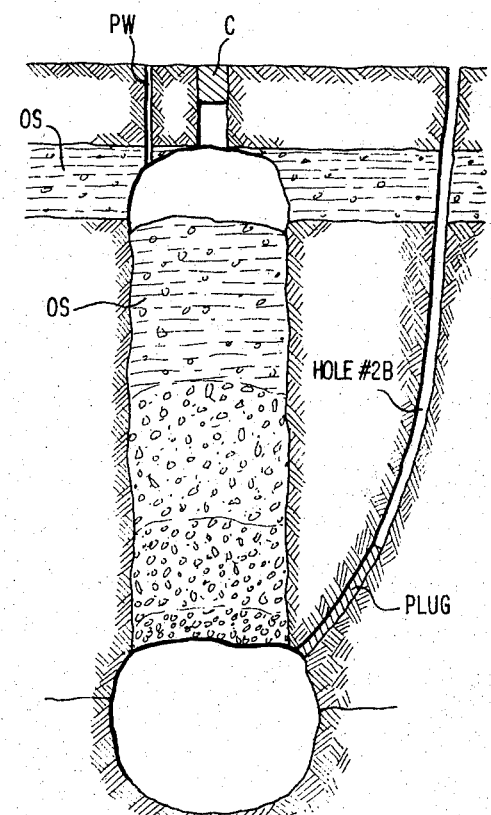
FIGURE 10 shows an alternate embodiment wherein a cavity analogous to the bottom cavity shown in FIGURE 8 is formed directly under the rock previously broken and compacted by a series of detonations, using a slant and whipstock hole.
Figure 11:
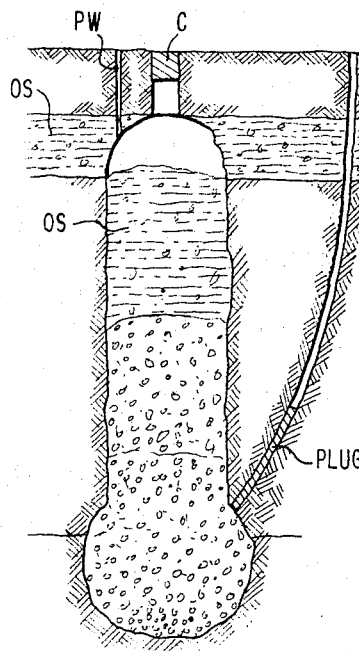
FIGURE 11 is a view thru an oil shale formation showing a plurality of columns of broken rock formed using the scheme illustrated in FIGURE 10, the columns being spaced a sufficient distance apart to prevent the compacting of the broken permeable rock in the first column during the creation of the second column.
Figure 11:
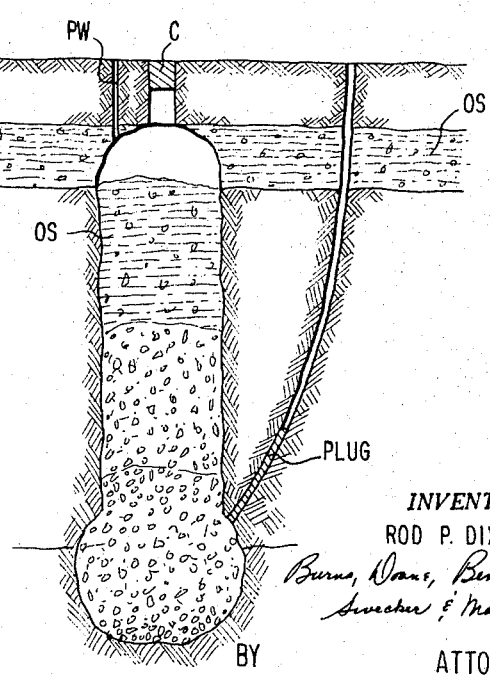

According to the present invention a large diameter hole is produced by first drilling a relatively slim hole being a bottom diameter of about 6" to 18" to the desired depth e.g. 12,000', the hole being large enough to receive a relatively small nuclear device, for instance, the 12" diameter device having a 10 kt. yield. At the present stage of the art a 12" diameter hole will accommodate a 10 kiloton yield device at a depth of 12,000'. A 10 kt. yield device at approximately 12,000' will produce a cavity of approximately 50' radius. Thereafter the hole is re-drilled by the same drill so as to open up any of the hole that had been caved by the detonation as well as to remove the plug placed in the hole prior to the detonation to prevent venting. The drilling tool is then removed and the reaming tool used in the hole in the usual manner to enlarge the hole to the size required for accommodating a nuclear device of a substantially large size e.g. 44" OD as to contain a 10 megaton yield device.

The volume of material to be reamed in a given size hole to a specified depth can of course be calculated and a detonation placed at the bottom of the smaller hole selected to make a chamber of the necessary size. The first nuclear device used in the process of the present invention is accordingly selected based on known criteria to make a chamber of a sufficient size for receiving the cuttings produced in reaming the slim hole to the size required for accepting the larger device or devices to be used subsequently.

This invention further provides a means for utilizing the relatively cheaply produced energy in cases where the energy is released in the formation at the depth which is substantially below the hydrocarbon zone to be treated. For instance, in Colorado in the deeper part of the Piceance Basin the thickest and probably the richest oil shale has a formation top at about 1,000' and has generally a 2,000' thickness. Thus the bottom of the shale zone is at about 3,000'. In such a formation using applicant's method the placement of a nuclear detonation somewhat below the shale zone to create a cavity and then the detonation of a second device thereabove to cave into said cavity the desired formation causes the arising of two very obvious problems. Using the AEC formula $x$ equals $450W^{1/3}$ for determining acceptable depth of device placement where $x$ is the depth of placement in feet and $W$ is the yield of the device in kilotons, a 250 kt. device could be placed at about 3,000'. For pure breaking energy the detonation particularly at that depth should be sufficient but clearly is inadequate for producing the heat energy required for destructive distillation of the contained kerogen or other hydrocarbons. Moreover, if it is the desire to block cave the overlying formation into the thus created cavity at the relatively shallow depth at which the further nuclear device required for such block caving be placed the device would have to be of such relatively small size to avoid venting that little additional usable energy would be released into the formation.

The present invention makes it possible to treat such a shallow shale formation with the cheap energy of a relatively large nuclear device by making use of seismic decoupling as well as device size placement by the relatively cheap process of detonation of a relatively small device at the foot of a narrow hole and sequentially reaming as earlier described herein.

Published reports show that at 12,000' the detonations of the various device sizes will produce cavities and chimney heights approximately as follows:

| Size | Cavity radius, feet | Chimney height, feet |
| --- | --- | --- |
| 10 kt | 50 | 200 |
| 100 kt | 150 | 400 |
| 1 meg | 200 | 850 |

It can be seen from the above that for a hundredfold energy increase the chimney height grows about four times. A detonation of 10 megaton at 12,000' will produce a 1250 to 1600' chimney depending somewhat on the particular formation treated. A hole is then drilled thru the cavity top and a further nuclear explosion in accordance with the present invention is placed, which again may be of 10 megaton size or could be smaller, on top of the rubble in the cavity. Here the principle of seismic decoupling is made use of in that the latter detonation has the gas of the first cavity to pass its shock wave thru before it becomes coupled to the formation. Thus at a shallower depth an equivalent yield can be emplaced without undue surface disturbance or venting. Sequentially upward device emplacement and detonation is repeated. If all of the oil shale formation to be treated does not block cave sufficient to provide the required permeability required for underground destructive distillation further smaller devices may be placed sequentially in and on the formation to be treated in order to cave it down to the full extent desired.

In this manner the invention makes it possible to place into the formation 30 to 40 megatons of energy contained in the chimney of the combined detonations. 30 megatons of energy if fully used in distilling oil shale of 15 to 25 gallons per ton average yield is sufficient to distill 90 million bbls. of oil from a shale oil formation such as that described.

Since each detonation in upward sequence will expend energy in a downward direction, thus using seismic decoupling, the formation below will become crushed and compacted. To overcome any excessive compacting a particularly preferred embodiment of the invention is to begin a next column of detonations at a point below the first or lower detnation in the first column. Being the largest device used, and since it has an associated prior detonated column which is more receptive to thrust than the untreated formation it will impart a larger portion of its energy to that column. As its cavity expands it will thrust upward the entire column of prior broken rock, expanding and emplacing energy as it does. Upon full cavity expansion and some energy running out lateral fissures the chamber will collapse. Its collapse will cause the first column to slide or block cave downward into the newly formed deep cavity; as the crushed rock of the first column caves into the collapsed bottom chamber permeability in the first detonated and progressively compacted rock column will be re-instated.

At this point a hole would be drilled to the top of the uppermost cavity and since the major portion of released energy is in the last and lowermost detonation there will be a general upward movement of energy. As it passes thru the broken shale zone at about 4,000' or so it will distill products which may be taken thru the drill hole.

It should be understood that while the invention has been described above principally in connection with treatment of oil shale and the recovery of useful hydrocarbon products therefrom the invention similarly is applicable to other formations containing semisolid or solid hydrocarbons such as tar sand, oil sand, bituminous limestone, kerogen rocks, peat coals, bituminous coals and anthracite coal. Moreover, while the invention is particularly valuable in connection with the treatment of such strata containing carbonaceous materials or hydrocarbons it is similarly useful in recovering other types of mineral values from rock formations. For instance, the invention can be used to break metal ore such as copper, silver, zinc, lead, iron in which case appropriate acid or alkaline solution can be pumped into the broken formation to leach or extract the desired metal therefrom and the heat accumulated underground may be useful in facilitating the solution process. Furthermore, the present process can provide an economical means for generating large amounts of energy in the form of steam for use above the surface. More particularly, by permitting the emplacement of very large amounts of thermal energy underground and simultaneously creating good permeability in the treated formation by use of very large nuclear devices which may range into the 10 to 100 or larger megaton yield the present invention makes it possible to generate large amounts of steam by pumping water into the thus treated formation and withdrawing steam from the top of a chimney relatively near the surface.

Having described the invention it is particularly pointed out and claimed in the claims set forth below.

What is claimed is:

1. A process for creating a large diameter bore hole of great depth in a geological formation which comprises drilling a relatively slim hole thru said formation to the desired depth, said slim hole having a sufficiently large bore to accommodate a small size nuclear explosive device, placing said small size device at the bottom of said slim hole, plugging said slim hole to prevent venting, detonating said small sized device and thereby creating a cavity at the bottom of said slim hole, and unplugging and reaming said slim hole to the desired large diameter bore, letting the cuttings produced in the reaming operation drop down the hole toward said cavity.

2. A process according to claim 1 wherein said small size nuclear device is of a size pre-determined to produce a cavity of sufficient volume to receive the cuttings produced in the reaming operation.

3. A process according to claim 1 which further comprises the steps of placing a large sized nuclear fusion device at the lower portion of said reamed hole, plugging said reamed hole, and detonating said large size device thereby creating a cavity in the formation and breaking and fracturing formation thereabove for the recovery of mineral values therefrom.

4. A process according to claim 3 wherein said slim hole is drilled to a depth of at least 5,000′, wherein said small size nuclear device has a yield of between 5 to 100 kt. and wherein said large size nuclear device has a yield of between 120 kt. to 100 megatons.

5. A process according to claim 3 where said formation is a formation containing metal ore.

6. A process according to claim 3 wherein said formation comprises a structure containing semi-solid to solid hydrocarbons.

7. A process according to claim 3 wherein after detonation of the aforesaid large sized nuclear device at least one further large sized nuclear device is detonated in sequence thereabove in said reamed hole under non-venting conditions.

8. A process according to claim 7 wherein said further large sized nuclear device is placed on top of the rubble resulting from the previous detonation.

9. A process according to claim 7 wherein a second large size device is so upwardly spaced from the position of the first large sized device as to cause block caving of the intervening formation after detonation of a second device.

References Cited

UNITED STATES PATENTS

| | | | |
|---|---|---|---|
| 2,823,900 | 2/1958 | Kandle | 175—53 X |
| 3,113,620 | 12/1963 | Hemminger | 166—36 X |
| 3,186,499 | 6/1965 | Bullard et al. | 166—0.5 |
| 3,233,670 | 2/1966 | Thompson et al. | 166—11 |

OTHER REFERENCES

Johnson et al., "Non-Military Uses of Nuclear Explosives," Scientific American, December 1958, Volume 199, No. 6, pp. 29–35.

Rabb, "Block Caving, Nuclear Style," Mining Engineering, March 1964, pages 48–52 (TN 1 M 784).

STEPHEN J. NOVOSAD, *Primary Examiner.*